(12) United States Patent
Jin Hyun et al.

(10) Patent No.: US 7,862,254 B2
(45) Date of Patent: Jan. 4, 2011

(54) UNDERGROUND ROOT MARGIN EVEN IRRIGATION APPARATUS

(76) Inventors: Kim Jin Hyun, 759-5 YounWon-Dong, Sangju, GyeongSangBuk-Do (KR); Cho Doo ho, 596-3 Daejeon-dong, Yeongcheon-si, Gyeongsangbuk-do (KR)

( * ) Notice: Subject to any disclaimer, the term of this patent is extended or adjusted under 35 U.S.C. 154(b) by 6 days.

(21) Appl. No.: 12/349,995

(22) Filed: Jan. 7, 2009

(65) Prior Publication Data
US 2009/0175683 A1   Jul. 9, 2009

(30) Foreign Application Priority Data
Jan. 9, 2008   (KR) ...................... 10-2008-0002481

(51) Int. Cl.
*E02B 13/00* (2006.01)
(52) U.S. Cl. .................. 405/40; 405/39; 405/43; 405/51; 47/48.5
(58) Field of Classification Search ............... 405/36, 405/37, 39, 30, 43, 44, 45, 47, 51; 47/48.5
See application file for complete search history.

(56) References Cited

U.S. PATENT DOCUMENTS

| | | | | |
|---|---|---|---|---|
| 986,003 A * | 3/1911 | Hohenstein | ................... | 405/51 |
| 1,010,819 A * | 12/1911 | Thompson | ................... | 405/51 |
| 1,042,501 A * | 10/1912 | Thompson | ................... | 405/51 |
| 1,231,308 A * | 6/1917 | Steelquist | ................... | 405/51 |
| 1,960,472 A * | 5/1934 | Balaam et al. | ................. | 405/51 |
| 2,875,713 A * | 3/1959 | Shoffner | ...................... | 47/48.5 |
| 3,442,087 A * | 5/1969 | Riusech | ........................ | 405/51 |
| 3,672,571 A * | 6/1972 | Goodricke | ...................... | 47/47 |
| 3,814,377 A * | 6/1974 | Todd | ............................. | 405/39 |
| 3,901,448 A * | 8/1975 | Babin | ........................... | 405/51 |
| 4,153,380 A * | 5/1979 | Hartman | ....................... | 405/39 |
| 4,223,840 A * | 9/1980 | La Scala et al. | .............. | 47/48.5 |
| 4,538,377 A * | 9/1985 | Thornton | ..................... | 405/51 |
| 4,721,408 A * | 1/1988 | Hewlett | ....................... | 405/51 |
| 4,930,934 A * | 6/1990 | Adkins | ........................ | 405/45 |
| 5,054,690 A * | 10/1991 | Olson | .......................... | 405/43 |
| 5,102,259 A * | 4/1992 | York et al. | .................... | 405/46 |
| 5,113,888 A * | 5/1992 | Beggs | ......................... | 47/48.5 |
| 5,172,515 A * | 12/1992 | Lapshansky et al. | ......... | 47/48.5 |
| 5,310,281 A * | 5/1994 | Elena | .......................... | 405/51 |
| 5,735,076 A * | 4/1998 | Masui et al. | ................. | 47/48.5 |
| 5,878,953 A * | 3/1999 | Coffman | ........................ | 239/1 |
| 6,036,104 A * | 3/2000 | Shih | ............................ | 47/48.5 |
| 7,040,839 B1 * | 5/2006 | Mazzei | ........................ | 405/51 |
| 2003/0154652 A1 * | 8/2003 | Dramm et al. | ............... | 47/48.5 |

* cited by examiner

*Primary Examiner*—Frederick L Lagman
(74) *Attorney, Agent, or Firm*—Kramer & Amado, P.C.

(57) ABSTRACT

Disclosed are an even-irrigation apparatus for an underground root zone and an even-irrigation method using the same for evenly supplying water into the root zone of a variety of crops. The even-irrigation apparatus includes a plurality of irrigators buried in the entire underground root zone, to directly and evenly supply water into the root zone. Once water is introduced into a pressure-reduction valve after passing through a main pipe, limb pipe and capillary pipe connected in sequence, the water is supplied to the irrigators by way of a plurality of diverged-capillary pipes. With this even-irrigation of water, unnecessary consumption of water due to adsorption of the water into the surrounding soil except for the root zone is minimized, enabling effective irrigation of water and even growth of roots of crops. Further, even nutrition throughout the roots enables balanced growth of crops.

4 Claims, 10 Drawing Sheets

[Fig. 1]
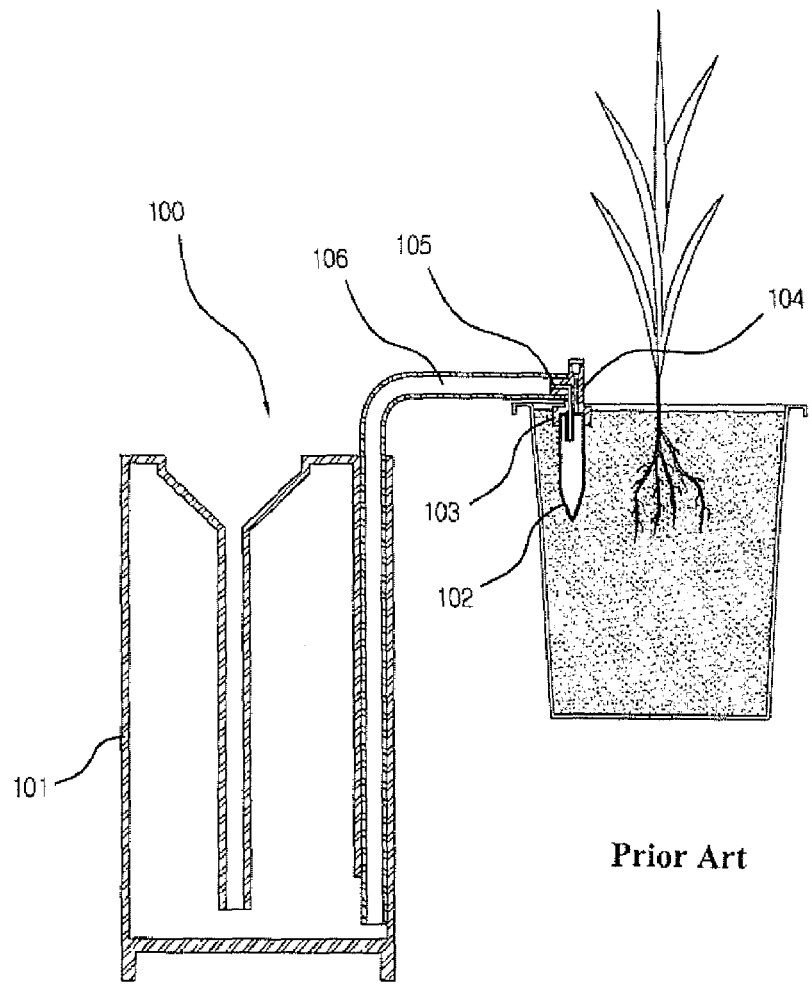
Prior Art
[Fig. 2]
Prior Art
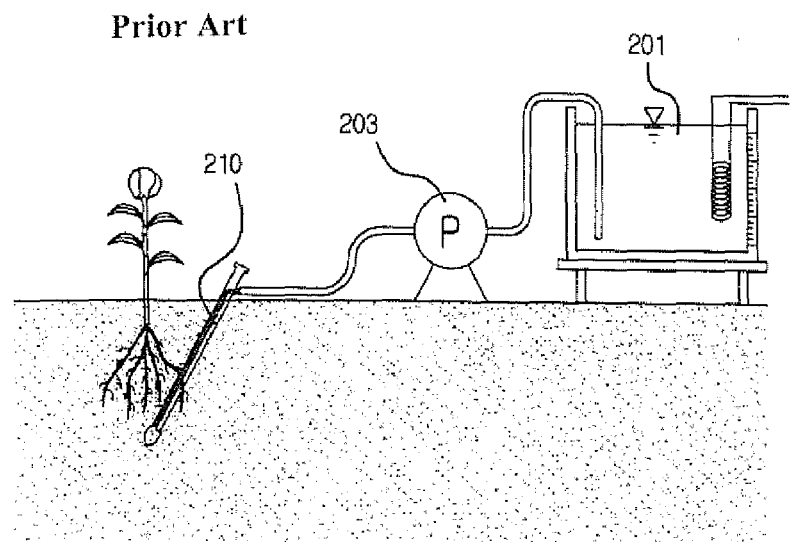

[Fig. 3]
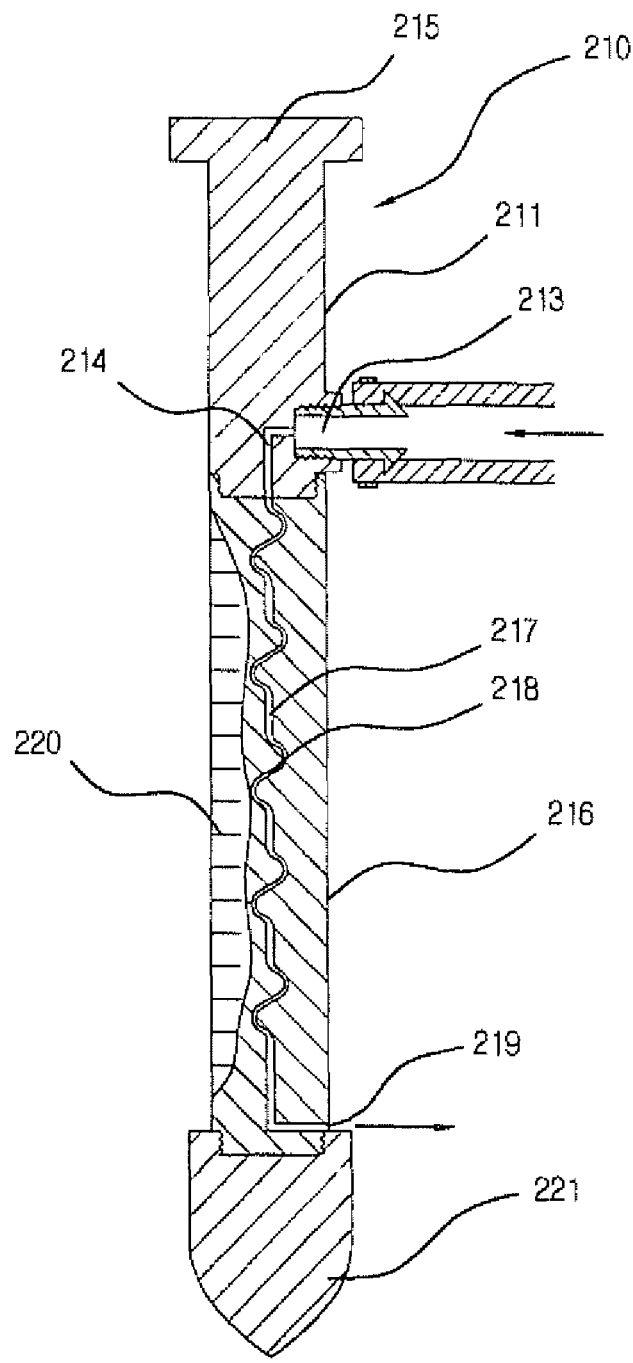
Prior Art

[Fig. 4]
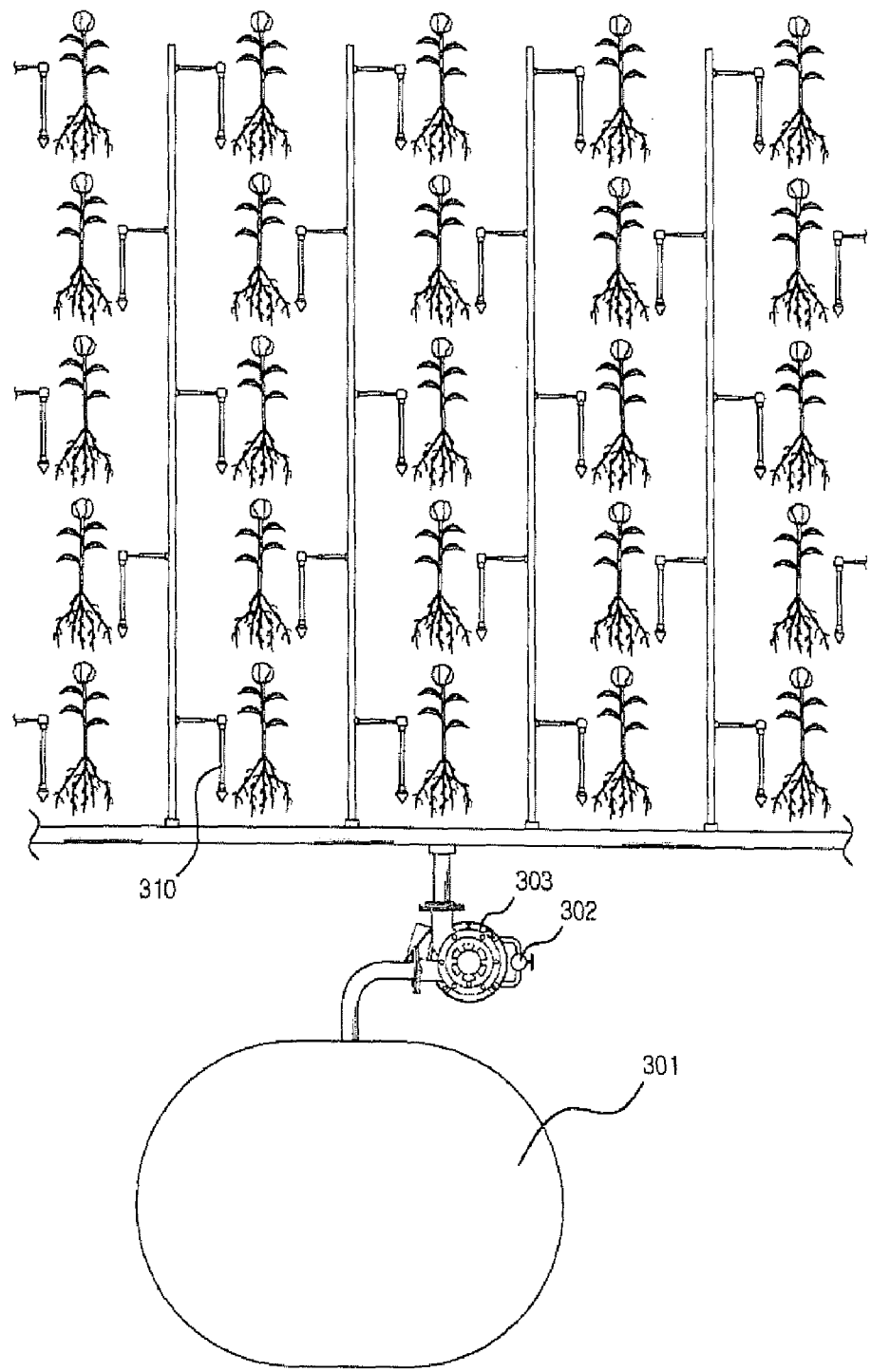
Prior Art

[Fig. 5]
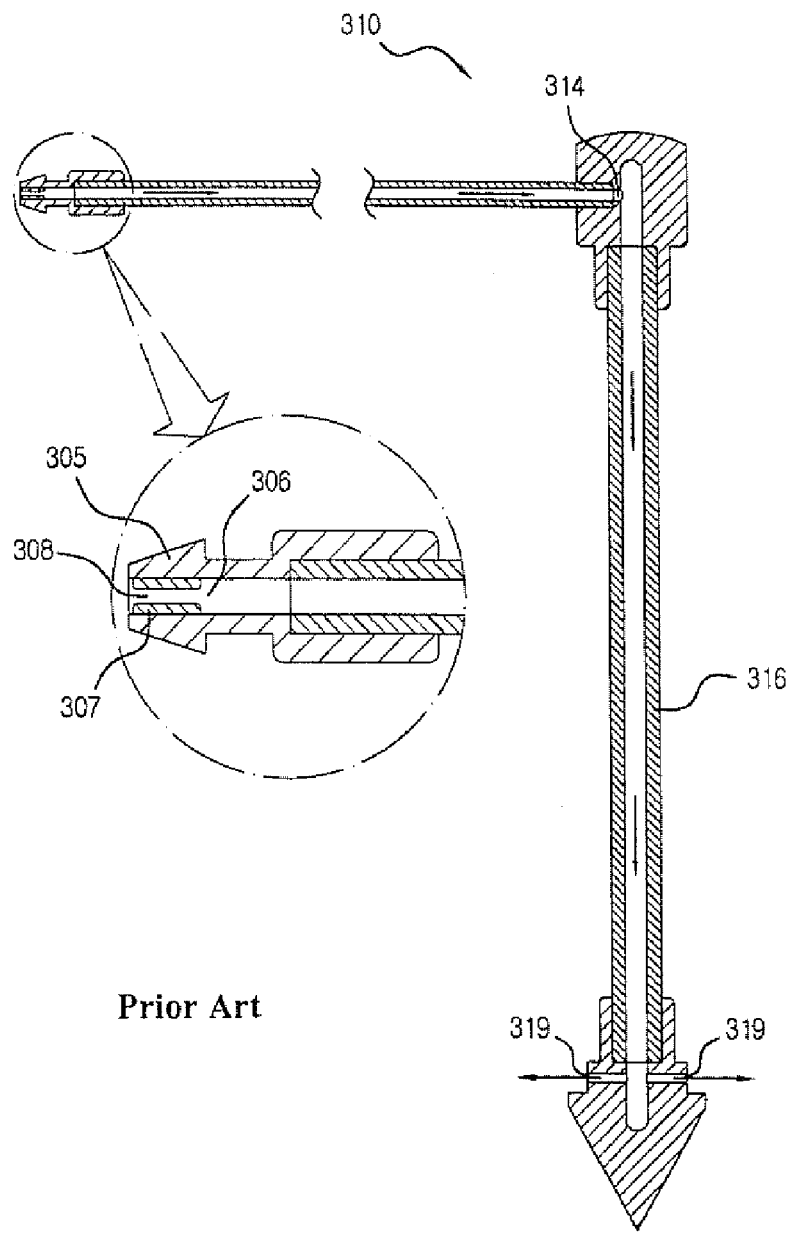
Prior Art

[Fig. 6]
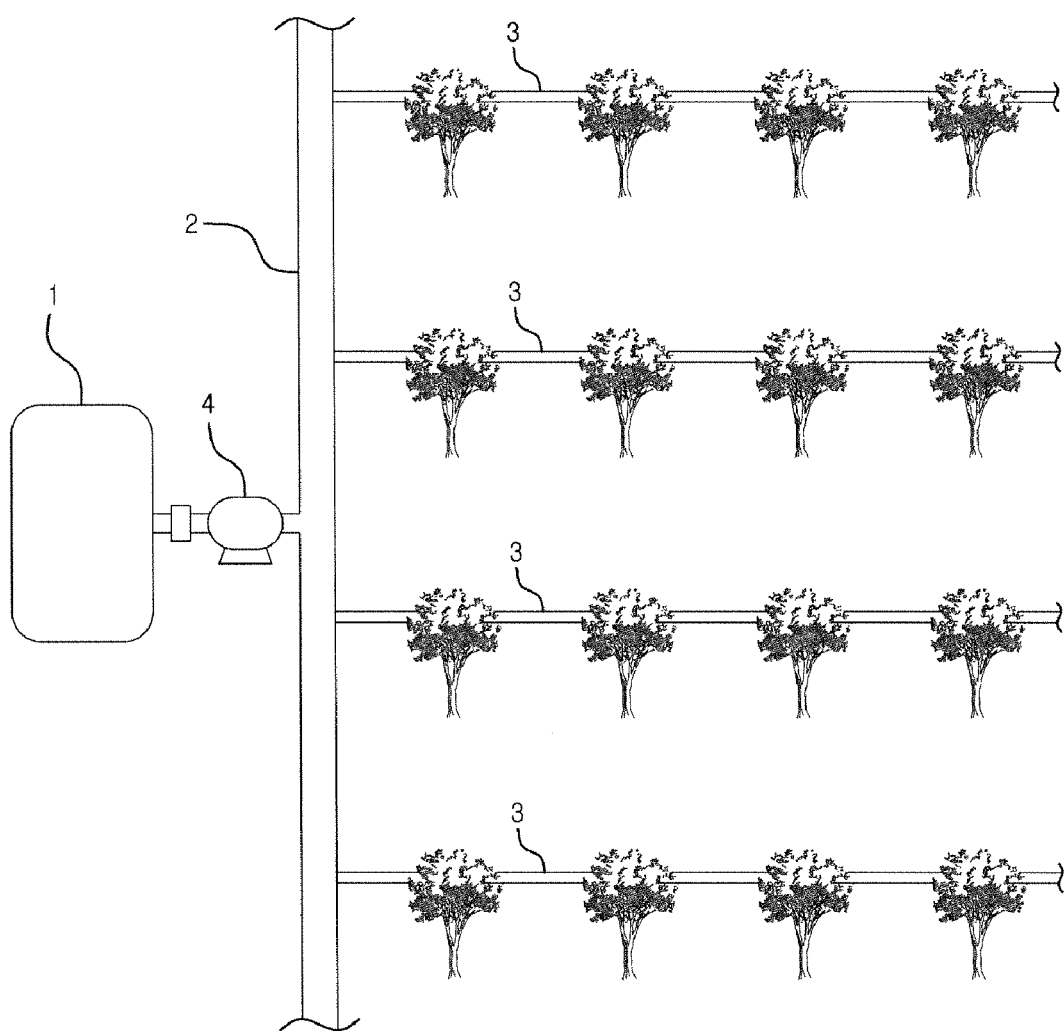

[Fig. 7]
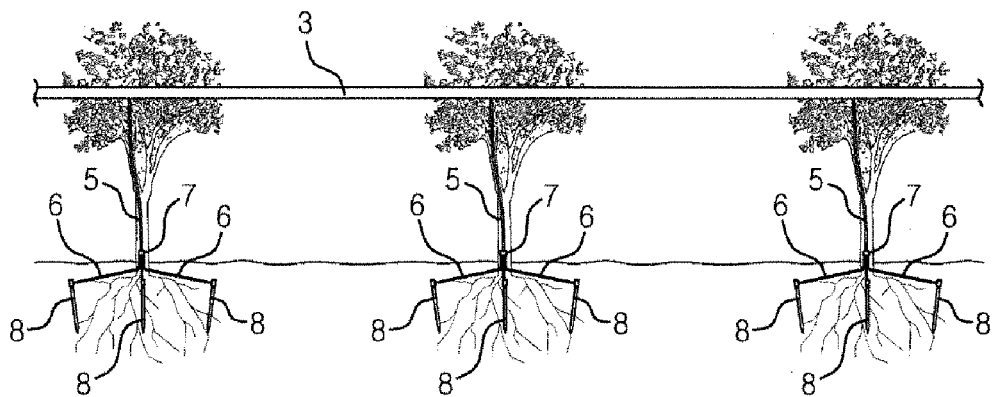
[Fig. 8]
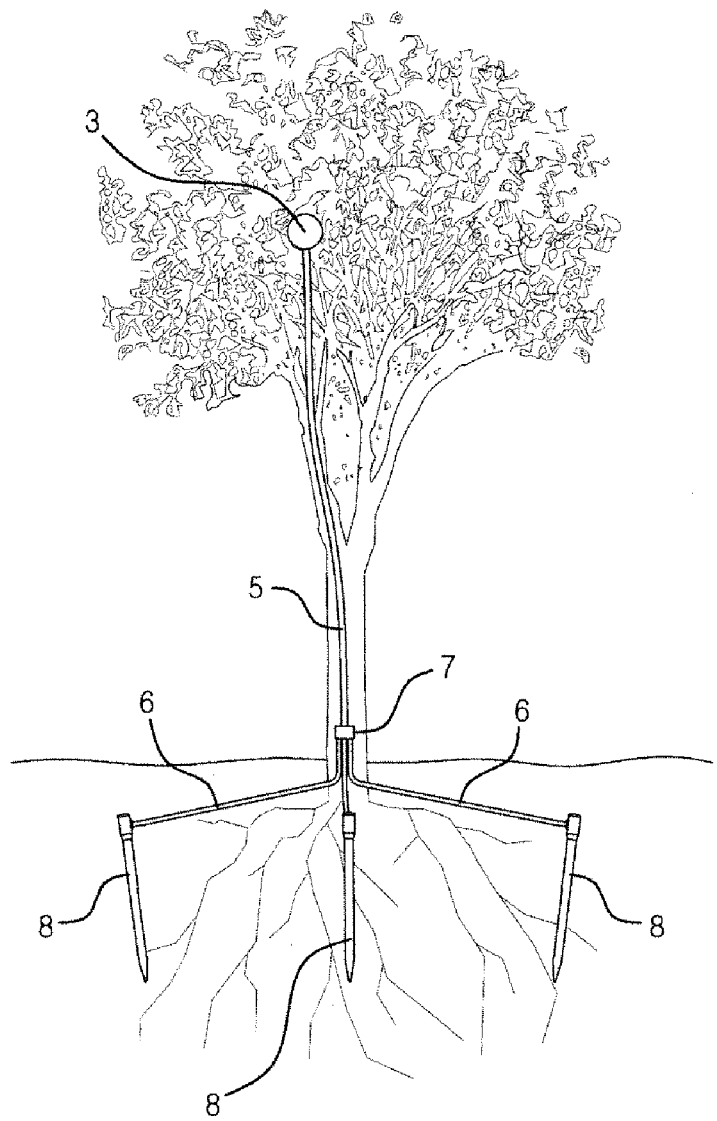

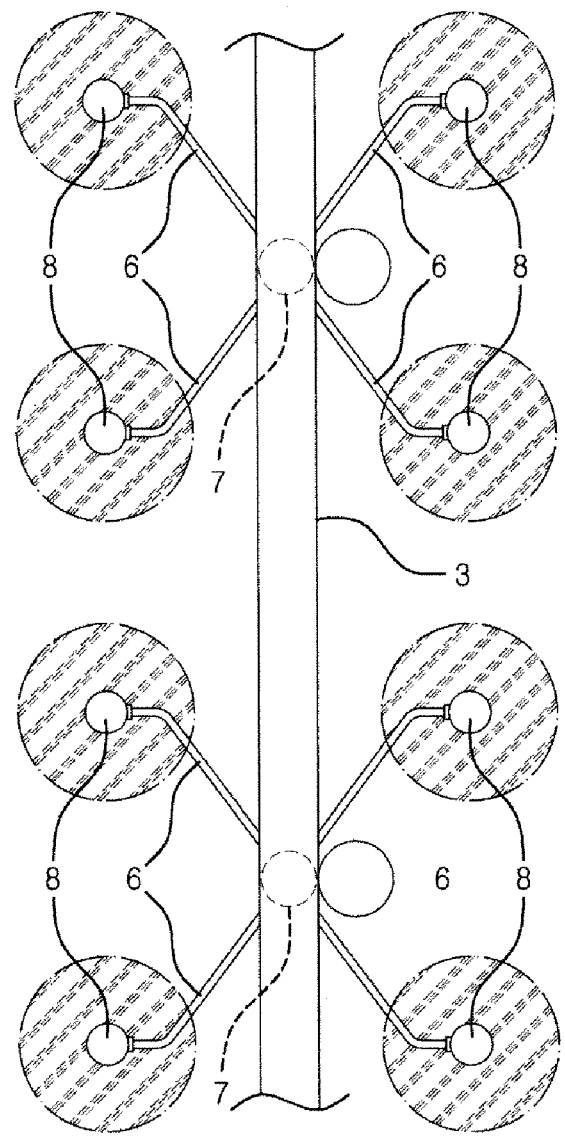
[Fig. 9]

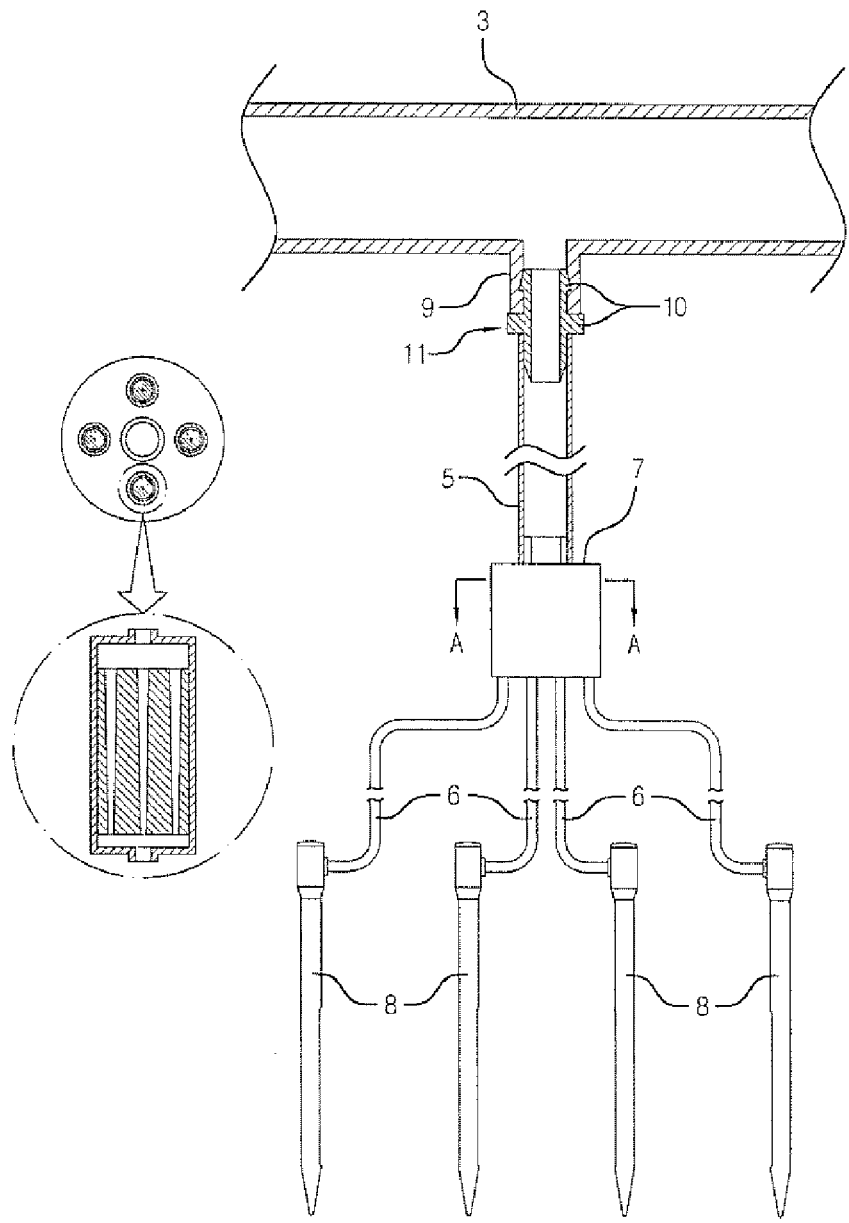
[Fig. 10]

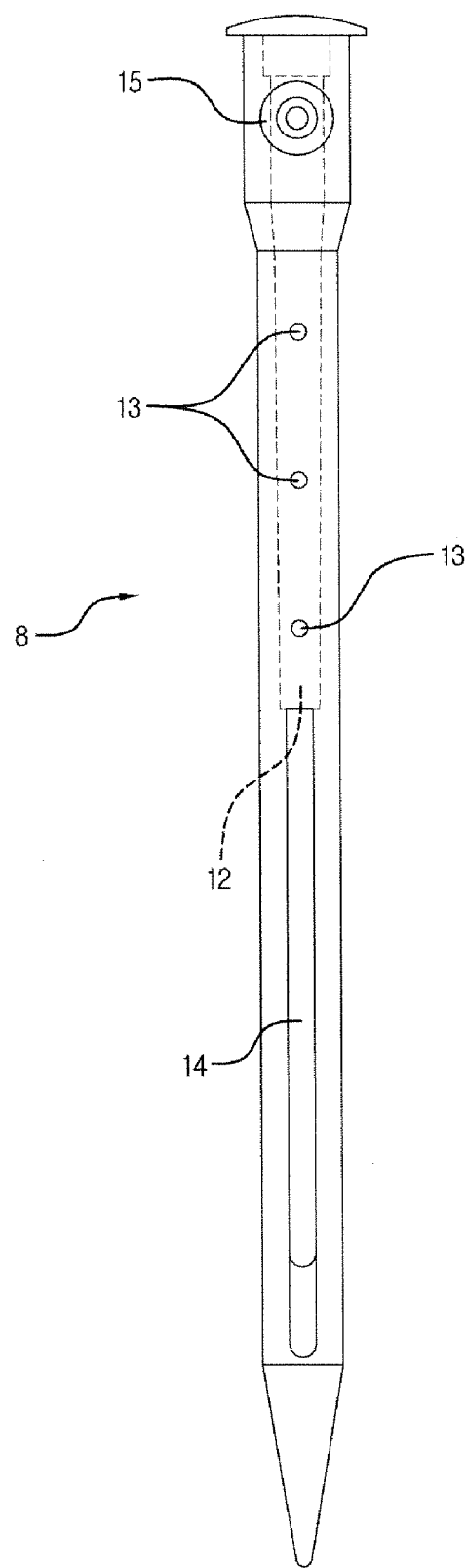
[Fig. 11a]

[Fig. 11b]
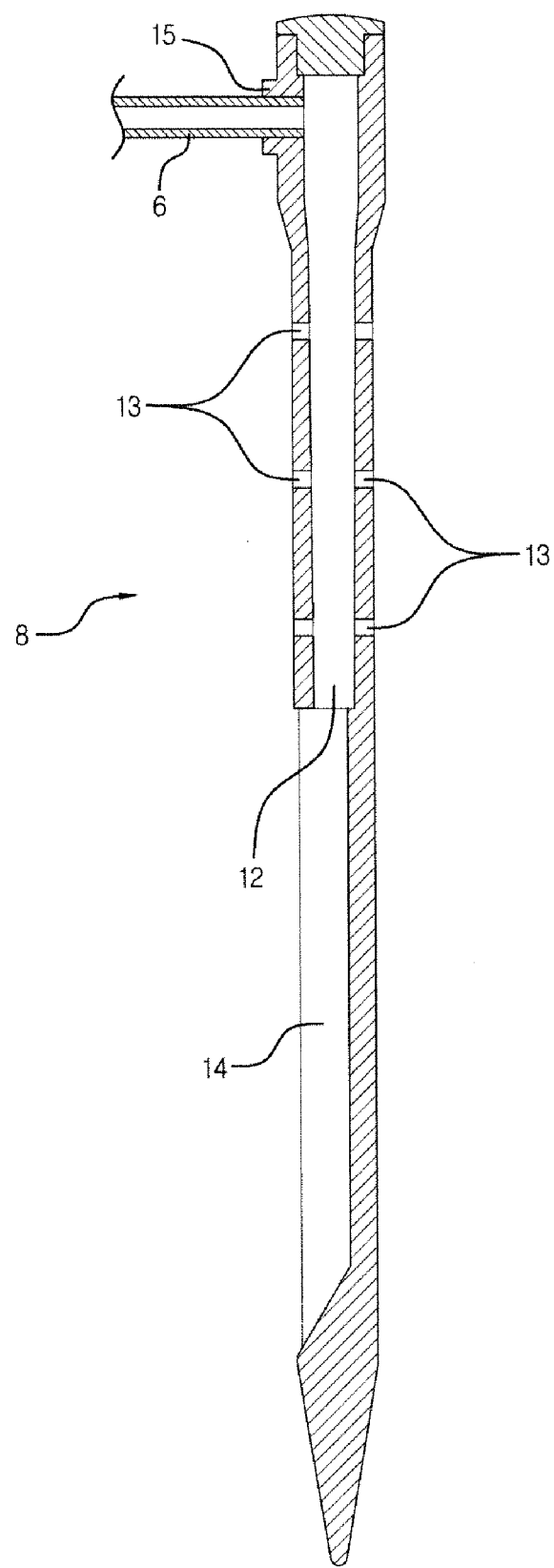

UNDERGROUND ROOT MARGIN EVEN IRRIGATION APPARATUS

BACKGROUND OF THE INVENTION

1. Field of the Invention

The present invention relates to an even-irrigation apparatus for an underground root zone and an even-irrigation method using the same, and more particularly, to an even-irrigation apparatus for an underground root zone and an even-irrigation method using the same, which can directly and evenly supply water to the root zone of a variety of crops, such as fruit trees, decorative plants, landscaping plants, etc.

2. Description of the Related Art

As is shown, there are a variety of irrigation methods including hose-irrigation, drip-irrigation, jet-irrigation, spray-irrigation, mist-irrigation, furrow-irrigation, underground-irrigation, etc.

Specifically, hose-irrigation is a method for supplying the ground surface with water using hoses. In drip-irrigation, a plastic pipe or tube is perforated with small-diameter holes, and capillary tubes connected to the holes are provided at tip ends thereof with nozzles or water outlets, from which water droplets are dropped in small amounts. Jet-irrigation is a method in which water is ejected from tubes perforated with holes, spray-irrigation is a method for spraying water using nozzles, and mist-irrigation is a method using a mist generator for changing water into ultra-fine globules of water. Also, furrow-irrigation is a method for supplying water into furrows included in facilities, and underground-irrigation is a method for directly supplying water to roots of crops using irrigation pipes embedded underground.

All the above-mentioned irrigation methods, except for the underground-irrigation, are used to supply the earth surface with water and cannot directly supply water to roots of crops, causing excessive consumption of water due to evaporation and consequently, increasing the usage of agricultural water. For this reason, the underground-irrigation has been widely employed. For example, Korean Patent Publication No. 1987-6 (entitled "Automatic Water Supply Device", hereinafter referred to as "cited invention 1") discloses a water supply device based on underground-irrigation. The disclosed water supply device is illustrated in FIG. 1.

As shown in FIG. 1, the automatic water supply device 100 includes a water reservoir 101, a water supply head 102, and a water supply pipe 106. The water reservoir 101 has a water level lower than a position at which the water supply head 102 is inserted into the soil of a pot. The water supply pipe 106 is connected between a lower interior position of the water reservoir 101 and the water supply head 102. The water supply head 102 includes a tubular water supply portion 103, which is made of a water-permeable material and has a closed conical lower end, the tubular water supply portion 103 being inserted into the soil, a head portion 104, which is made of a waterproof material and is connected to an upper open end of the tubular water supply portion 103, and a water outlet 105 through which water, having passed through the water supply pipe 106, is directed into the head portion 104 of the water supply head 102.

The above-described conventional automatic water supply device is designed to continuously supply water on the basis of a pressure difference caused depending on the content of moisture in the pot, more particularly, the germination pot. Evaporation of moisture supplied into the germination pot causes a reduction in the interior pressure of the pot. With the resulting pressure difference, water stored in the water reservoir is drawn into the germination pot. Although this continuous automatic supply of water in response to the evaporation of moisture is advantageous in view of the maintenance of an appropriate amount of moisture, it cannot be said that maintaining the optimal constant content of moisture is essentially beneficial to cultivation of field products, such as vegetables, or fruit trees. As occasion demands, it may be necessary to supply water in proportion to the photosynthesis of a plant, or to control a low content of moisture. Therefore, in fact, the above-described automatic water supply device cannot be appropriately used because adjusting the supply amount of water and the supply position of water in the soil in consideration of growing conditions of a plant is advantageous to achieve improved productivity of the plant with reduced consumption of water.

Furthermore, the above-described conventional automatic water supply device is costly equipment. In an agricultural cultivation environment wherein water must be supplied to a great amount of crops, such as fruit trees, decorative plants, etc., distributed over a wide area, it is difficult to install a plurality of such costly equipment. For this reason, the use of the automatic water supply device is limited only to laboratories for measuring the content of moisture in soil, nutrient-solution cultivation greenhouses, etc.

To solve the above-described problem, the applicant of the present invention has proposed Korean Patent Registration No. 556300 (entitled "Underground Irrigation System", hereinafter referred to as "cited invention 2"). In the disclosed underground irrigation system, as shown in FIGS. 2 and 3, water is directly supplied to roots of a plant from a position optimally selected in consideration of the growth of roots of the plant, for assuring effective rooting of the plant, effective adsorption only to the roots of the plant and consequently, facilitating the growth of the plant. The conventional underground irrigation system includes a water reservoir 201 in which water is stored, a pumping device 203 to pump the water stored in the water reservoir 201 by a set pressure, and an irrigator device 210 installed adjacent to a plant. The irrigator device 210 includes a head portion 211, a body portion 216 and a tip portion 221. The head portion 211 is laterally formed with an inlet 213, into which the water pumped by the pumping device 203 is introduced, and a water tube 214 is received in the head portion 201 so as to extend vertically from the lateral inlet 213. Further, a hitting portion 215 is formed at the top of the head portion 211. The body portion 216, which is coupled to the bottom of the head portion 211, internally defines a center passage 217 in communication with the water tube 214, and an outlet 219 in communication with the passage 217 is formed at a lower end of the body portion 216, to discharge the water to the outside. The tip portion 221 is coupled to the bottom of the body portion 216 and is conically tapered to assure easy insertion thereof into the ground. The body portion 216 is externally provided with a scale 220, to assist a user in insertion of the irrigator device 210 to an optimal depth underground, so as to supply water at an optimal position depending on the growth of roots of the plant. The center passage 217 of the body portion 216 is combined with a delay passage 218, which serves to delay the flow rate of water passing through the center passage 217 while increasing the temperature of water.

The above-described cited invention 2 has an advantage in that it can facilitate the growth of crops by allowing roots of crops to be rapidly spread downward, thereby enabling early harvesting of crops while preventing cold-weather damage of shallow roots, resulting in an increase in profitability. Further, by virtue of reduced evaporation of moisture, the cited invention 2 can restrict dew condensation at facility houses and minimize disease damage to crops. Furthermore, supplying water into a deeper underground region can prevent the ground surface from being muddy, increasing workability with respect to harvesting, disaster measures, transportation of handcarts, etc., and remarkably reduce the usage of agricultural water, resulting in reduced consumption of water resources and increased growth effects.

As another solution, the applicant of the present invention has proposed Korean Patent Registration No. 594479 (entitled by "Underground Irrigation System", hereinafter referred to as "cited invention 3") as shown in FIGS. 4 and 5.

As shown, the underground irrigation system disclosed in cited invention 3 includes a water reservoir 301 in which water is stored, a pumping device 303 to pump the water stored in the water reservoir 301, and a plurality of irrigator devices 310, each of which includes a tubular body 316 to supply the water, pumped by the pumping device 303, into the ground, the tubular body 316 being provided at opposite ends thereof with an inlet 314 and an outlet 319. A pressure control valve 302 having a knob is installed at one side of the electric pumping device 303. Nipples 305 are provided at respective junction positions of a pipe, which connect the pumping device 303 and the respective irrigator devices 310 to each other. A reducer 307 having a pressure-reduction hole 308 is inserted into a center hole 306 of each nipple 305.

All the above-described cited inventions wherein a single irrigator device is used to supply water to a single position commonly have a problem in that roots of a plant are inclined toward the irrigator device according to the passage of time, making it difficult to assure balanced growth of the plant. Moreover, although it is necessary to concentrate a desired amount of water required for the growth of a plant on a specific underground position, the above-described conventional irrigator devices provide only radial permeation of water, causing evaporation of about 50% of water supplied, or causing water to be adsorbed into irrelevant soil distant from a root zone. This requires supplying double the water that is actually adsorbed to crops and results in waste of water resources.

SUMMARY OF THE INVENTION

Therefore, the present invention has been made in view of the above problems, and it is an object of the present invention to provide an even-irrigation device for an underground root zone and an even-irrigation method using the same, wherein irrigators can evenly supply water to the entire root zone of a plant distributed below branches of the plant.

In accordance with an aspect of the present invention, the above and other objects can be accomplished by the provision of an even-irrigation apparatus for an underground root zone comprising a water tank, a pump connected between the water tank and a main pipe and used to supply water from the water tank into the main pipe, a plurality of limb pipes connected to the main pipe, and capillary pipes connected between the respective limb pipes and a plurality of irrigators buried in the root zone of a plant, the even-irrigation apparatus further comprising: a pressure-reduction valve having an entrance connected to a corresponding one of the capillary pipes and a plurality of exits connected to the plurality of irrigators via diverged-capillary tubes, the irrigators being equidistantly buried in the underground root zone.

In accordance with another aspect of the present invention, there is provided an even-irrigation method for an underground root zone comprising: pumping water stored in a water tank into a plurality of limb pipes by way of a main pipe under operation of a pump; and supplying the root zone of a plant with the water, supplied via the plurality of limb pipes and capillary pipes connected to the respective limb pipes, by use of a plurality of irrigators arranged in the root zone, wherein diverged-capillary pipes are interposed between a corresponding one of the capillary pipes and the irrigators, and the water supplied into the corresponding capillary pipe is reduced in pressure to a constant-pressure prior to being directed into the diverged-capillary pipes, whereby water is evenly supplied into the root zone of the plant by the plurality of irrigators equidistantly buried in the root zone

BRIEF DESCRIPTION OF THE DRAWINGS

The above and other objects, features and other advantages of the present invention will be more clearly understood from the following detailed description taken in conjunction with the accompanying drawings, in which:

FIG. 1 is a sectional view illustrating a conventional automatic water supply device based on underground-irrigation;

FIG. 2 is a schematic view illustrating a conventional underground irrigation system proposed by the applicant of the present invention;

FIG. 3 is a longitudinal sectional view of the conventional underground irrigation system shown in FIG. 2;

FIG. 4 is a schematic view illustrating another conventional underground irrigation system proposed by the applicant of the present invention;

FIG. 5 is a longitudinal sectional view of the conventional underground irrigation system shown in FIG. 4;

FIG. 6 is an explanatory view illustrating an even-irrigation apparatus for an underground root zone according to the present invention;

FIG. 7 is an explanatory view illustrating the arrangement of limb pipes, capillary pipes and diverged-capillary pipes installed to plants according to the present invention;

FIG. 8 is an explanatory view illustrating the supply of water with respect to a plant according to the present invention;

FIG. 9 is a plan view of the supply of water with respect to the plant according to the present invention;

FIG. 10 is an explanatory view illustrating the connection of limb pipes, capillary pipes and diverged-capillary pipes installed to the plant according to the present invention; and FIGS. 11A and 11B are explanatory views illustrating an irrigator according to the present invention.

DETAILED DESCRIPTION OF THE INVENTION

Now, an exemplary embodiment of the present invention will be described in more detail with reference to the accompanying drawings. FIGS. 6 and 7 illustrate the overall configuration of an even-irrigation apparatus for an underground root zone according to the exemplary embodiment of the present invention.

As shown, the even-irrigation apparatus for the underground root zone includes a water tank 1, a pump 4 connected between the water tank 1 and a main pipe 2 and used to supply an appropriate pressure of water from the water tank 1 to a plurality of limb pipes 3 by way of the main pipe 2, capillary pipes 5 branched from the respective limb pipes 3, and a plurality of pressure-reduction valves 7 provided at the respective capillary pipes 5 and having entrances into which the water having passed through from the limb pipes 3 and capillary tubes 5 is introduced.

In addition, each pressure-reduction valve 7 has a plurality of radially-arranged exits and in turn, diverged-capillary pipes 6 are connected to the respective exits of the pressure-reduction valve 7. Irrigators 8 are connected to the respective diverged-capillary pipes 6. In the present invention, the irrigators 8 are buried throughout the underground root zone while being spaced apart from one another by a predetermined distance. In this case, the irrigators 8 are buried in such a manner that upper ends of the irrigators 8 are at a depth of 5 cm to 10 cm from the ground surface.

In the above-described embodiment of the present invention, if power is applied to the pump 4, water is pumped by way of the main pipe 2, limb pipes 3 and capillary pipes 5 to thereby reach the entrances of the pressure-reduction valves 7. The interior of the respective pressure-reduction valves 7 is filled with a silicon filler, and thus, the water is reduced in pressure while passing through the pressure-reduction valves 7. In this way, water of constant-pressure is supplied into the plurality of irrigators 8 via the diverged-capillary pipes 6 connected to the exits of the pressure-reduction valves 7.

Specifically, the water having passed through the capillary pipes 5 reaches the plurality of pressure-reduction valves 7 provided on a per plant basis. In the present invention, after being reduced in pressure to a standard pressure while passing through the pressure-reduction valves 7, the water is discharged at a constant flow rate of, for example, 4 l/hr from each irrigator 8 by way of the diverged-capillary pipes 6.

With the above-described configuration, as the water is discharged from each irrigator 8 into the root zone, the discharged water is able to be evenly dispersed and adsorbed into roots and soil located in all directions of a water discharge position. In particular, according to the present invention, the water can be supplied to roots at a closest position from the roots, maximizing absorption of water by the roots while minimizing absorption of water by the surrounding soil.

In addition, according to the present invention, the irrigators 8 are equidistantly arranged in the entire root zone of the plant, assuring even dispersion of water in the entire root zone.

In this way, the water can be adsorbed into the entire roots of the plant, assuring effective supply of water required for the growth of the plant. This results in outstanding effects in the growth rate of plants, the quality of fruits, and the like.

More specifically, differently from the above conventional cited inventions wherein an excessive amount of water over the amount of water required for the growth of crops is supplied to a single location such that the water is first adsorbed into the surrounding soil to thereby reach roots distant from the initial supply location, according to the present invention, as shown in FIGS. 8 and 9, an appropriate amount of water is supplied simultaneously over the entire roots of the plant, assuring balanced rooting and allowing most of the supplied water to be directly adsorbed to the roots of the plant (the resulting wet weight is 125% of the original weight). This can significantly reduce the loss of water due to soil adsorption. Accordingly, as compared to the conventional underground-irrigation methods wherein water is supplied to a certain underground location within the root zone, the present invention can achieve remarkable water reduction effects and prevent waste of water resources. Moreover, according to the present invention, nutritive substances (nitrogenous, phosphatic and potassic fertilizers, etc.) that are insufficient in the growth of crops can be directly supplied into the root zone. This direct supply of nutritive substances assures a sufficient amount of adsorption even with a small amount of nutritive substances, contributing to harvesting of high-quality agricultural products and minimizing contamination of soil by preventing nutritive substances from being unnecessarily adsorbed into the surrounding soil.

In the above-described configuration according to the present invention, it will be appreciated that the greater the number of irrigators 8 arranged in the root zone of the plant, the higher the adsorption efficiency of water or nutritive substances into the roots of the plant. Of course, it is preferable to arrange an appropriate number of irrigators 8 according to the size of the root zone.

In the present invention, as shown in FIG. 10, the limb pipe 3 is formed with drain holes 9 by an appropriate distance, and a connector 11 is fitted into each drain hole 9. The connector 11 is formed with upper and lower stepped portions 10, the upper stepped portion being narrower than the lower stepped portion. As the capillary pipe 5 is connected to an exit of the connector 11, a very simplified connection between the limb pipe 3 and the capillary pipe 5 can be accomplished, resulting in efficient installation operation.

In the present invention, it was experimentally determined that an ideal length of the diverged-capillary pipe 6 is in a range of 50 cm to 100 cm according to the root zone of a plant.

In addition, as shown in FIGS. 11A and 11B, the irrigator 8 according to the present invention may include a coupling portion 15 connected to the diverged-capillary pipe 6, a guiding portion 12 extending downward from the coupling portion 15, the guiding portion 12 being formed at peripheral positions thereof with discharge holes 13, and a discharge portion 14 extending downward from the guiding portion 12 and having an open distal end. The irrigator 8 having the above-described configuration is able to supply water to a desired depth and width.

Although the above-described embodiment exemplifies the pressure-reduction valve 7 filled with the silicon filler, it will be appreciated that a variety of shapes of pressure-reduction valves can be applied to the present invention.

As apparent from the above description, the present invention provides an even-irrigation apparatus for an underground root zone wherein water supplied through a limb pipe is regulated in pressure while passing through a pressure-reduction valve, enabling a constant pressure of water to be supplied via a plurality of irrigators. As the plurality of irrigators supplies an even amount of water at positions close to the entire root zone of a plant, an optimal amount of water regulated by the pressure-reduction valve can be evenly supplied to all roots of the plant. This assures balanced growth and positioning of the roots of the plant, and minimizes unnecessary consumption of water caused as the water is adsorbed into soil except for the root zone, resulting in effective utilization of water resources.

Further, according to the present invention, even upon provision of nutritive substances to facilitate the growth of crops or to improve the quality of fruits, the nutritive substances can be evenly supplied throughout the root zone. This reduces the dosage amount of nutritive substances, and consequently, dosage costs. In particular, directly introducing the nutritive substances into the root zone of crops improves the adsorption of nutritive substances, resulting in a remarkable improvement in the growth rate of crops and production of high-quality crops.

The direct introduction of nutritive substances into the root zone according to the present invention can minimize contamination of soil around the root zone and enable production of high-quality crops.

According to the present invention, as an appropriate amount of water is accurately supplied only to the root zone of a target plant, it is difficult for parasitic plants, such as weeds, etc., to acquire water required for the growth thereof. This has the effects of reducing labor costs for weeding and restricting the use amount of weed killers.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An even-irrigation apparatus for an underground root zone comprising a water tank, a pump connected between the water tank and a main pipe and used to supply water from the water tank into the main pipe, a plurality of limb pipes connected to the main pipe, and capillary pipes connected between the respective limb pipes and a plurality of irrigators buried in the root zone of a plant, the even-irrigation apparatus further comprising a connector having an entrance connected to a corresponding one of drain holes formed in each limp pipe by an appropriate distance, and an exit connected to the corresponding capillary pipe, the connector having a narrower upper stepped portion and wider lower stepped portion.

2. The apparatus according to claim 1, wherein the diverged capillary pipes have a length in the range of 50 cm to 100 cm.

3. An even-irrigation apparatus for an underground root zone comprising a water tank, a pump connected between the water tank and a main pipe and used to supply water from the water tank into the main pipe, a plurality of limp pipes connected to the main pipe, and capillary pipes connected between the respective limb pipes and a plurality of irrigators buried in the root zone of a plant, wherein the pressure-reduction valve, installed between the corresponding capillary pipe and the diverged-capillary pipes, is internally filled with a silicon filler.

4. The apparatus according to claim 3, wherein the diverged-capillary pipes have a length in the range of 50 cm to 100 cm.

* * * * *